United States Patent Office.

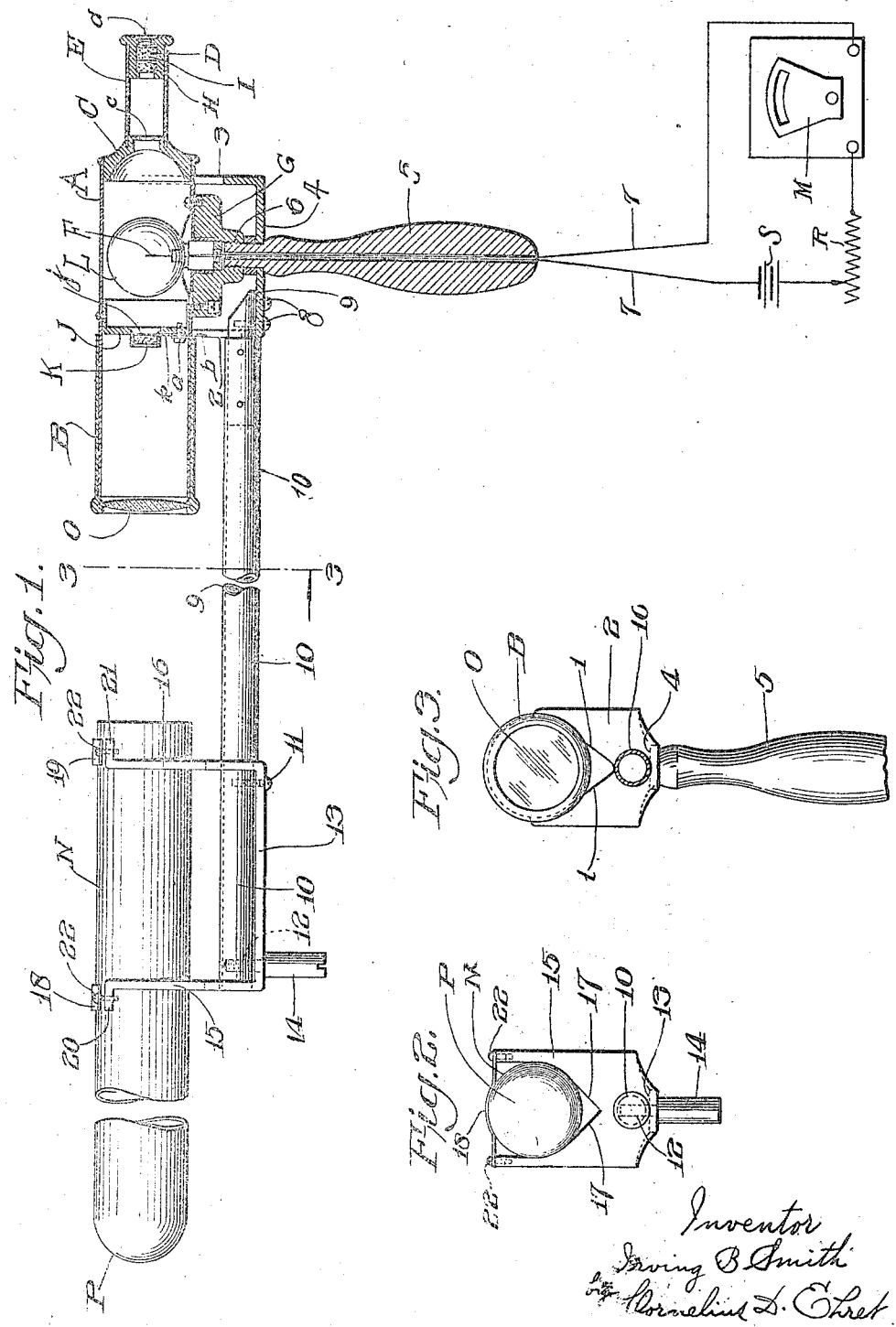

IRVING B. SMITH, OF AMBLER, PENNSYLVANIA, ASSIGNOR TO LEEDS & NORTHRUP COMPANY, OF PHILADELPHIA, PENNSYLVANIA, A CORPORATION OF PENNSYLVANIA.

APPARATUS FOR OPTICAL PYROMETRY.

1,282,967.   Specification of Letters Patent.   Patented Oct. 29, 1918.

Application filed March 6, 1918. Serial No. 220,678.

*To all whom it may concern:*

Be it known that I, IRVING B. SMITH, a citizen of the United States, residing in Ambler, State of Pennsylvania, have invented certain new and useful Improvements in Apparatus for Optical Pyrometry, of which the following is a specification.

My invention relates to optical pyrometry involving apparatus for comparing with the brightness of an incandescent body the brightness of an incandescent lamp filament through which is passed a current whose strength is measured to give an indication of the temperature of the incandescent body.

It is the object of my invention to provide means whereby a black body subjected to the temperature to be measured may be held in correct optical relation with respect to the optical apparatus by which the aforementioned comparison is made.

And it is more particularly the object of my invention to provide means for holding a tube serving as the black body in proper optical relation with the optical apparatus.

To these ends I have devised structure of the character hereinafter described and claimed.

For an illustration of one of the various forms my invention may take, reference is to be had to the accompanying drawing, in which:

Figure 1 is a side elevational view, some parts in longitudinal section, of structure embodying my invention.

Fig. 2 is an elevational view of that part of the apparatus of Fig. 1 at the left end thereof.

Fig. 3 is an end elevational view, partly in section, on the line $w$—$w$ of Fig. 1.

Referring to the drawing, A is a tube held against the inclined or curved surfaces 1 of the upright members 2 and 3 secured to or integral with the horizontal member 4 through which extends the hollow handle 5 having the hollow stud 6 threaded into member G, whereby tube A is held in place against members 2 and 3. Upon the tube A telescopes the tube B in whose end is carried the lens or objective O. At one end of the tube A is the member C carrying the eye piece E having the lens D at the aperture $d$. The lens O, the aperture $c$ in the member C, the lens D and the aperture $d$, have a common axis which is the optical axis of the apparatus.

Disposed within the tube A is the incandescent electric lamp L having the filament F. The lamp L is held in a suitable socket in the member G of insulating material, secured to the tube A, which is cut away at this region to admit the lamp L. The lamp filament F is connected in circuit by wires 7, 7 with a suitable source of current, as a battery S, the rheostat or adjustable resistance R and the milliammeter or other suitable instrument M.

In the eye piece E adjacent the lens D are interposed the color selective screens H and I, as of red glass.

In the tube A between the filament F and the lens O is a diaphragm J having the aperture $j$. An absorption screen K, held by the member $k$ pivoted at $a$ to the diaphragm J, may be moved to position to register with the aperture J by the lever $b$ extending to the exterior of the tube A and forming an extension on the member K.

The member 6 is secured by screws 8 to the rod or tube 9 extending into and secured to the tube 10, the latter secured by screws 11 and 12 to the member 13. The screw 12 may have the elongated head 14, by which the apparatus may be rested on any suitable support or hooked within the upper edge of a crucible containing material whose temperature is to be measured. Secured to or integral with the member 13 are the bracket members 15 and 16 against the inclined or curved edges 17 of which is clamped the tube N by the clamps 18 and 19, held to the laterally turned portions 20 and 21 of the members 15 and 16 by screws 22.

The tube N serves as a Kirchhoff black body, and may be composed of quartz or other suitable material. The tube N is closed at its end, as indicated at P.

The end P of the tube N is thrust to suitable distance into the material or medium whose temperature is to be determined, the end P of the tube being raised to the unknown temperature, which is sufficiently high to cause the end P to glow. The sides of the tube adjacent the end P also glow, but with a brightness which diminishes with distance from the end P.

To measure the temperature, current is passed through the filament F to cause it to glow or to be raised to incandescence. With the eye at the aperture d, the tube B is moved backwardly or forwardly until the image of the glowing black body, the end P of the tube N, is brought by lens O to focus in the plane of the lamp filament F. The rheostat R is then adjusted to vary the current through the filament F to vary its brightness until it corresponds with that of the black body. The temperature of the black body is then read on the scale of the instrument M; or if the instrument M is not calibrated in temperatures but in units of current, the temperature may be read off from a calibration table, chart or curve in which, for the particular lamp L, employed, temperatures corresponding with different current strengths are given or plotted.

In employing apparatus of the character above described, where the tube N is separate from the optical apparatus, it is difficult for the operator to view the bottom or end P of the tube N, particularly when it is about three feet long and of one inch diameter; and he may and generally would be sighting upon part of the interior of the tube N sufficiently remote from the end P to be at a lower, or in any event, different temperature than that to be determined.

By the structure described, however, the tube N is held in fixed position with respect to the optical apparatus. The axis of the optical apparatus and the axis of the tube N coincide with an accuracy insuring that only the bottom or end P of the tube N will be viewed by the operator.

What I claim is:

1. Optical pyrometric apparatus comprising a portable frame, a member secured to said frame and having a part serving as a black body adapted to be subjected to the temperature to be measured, an optical system including an incandescent lamp, and means supporting said system on said frame at a distance from said member in position to bring said black body in the optical axis of said system.

2. Optical pyrometric apparatus comprising a portable frame, a tube having a closed end serving as a black body adapted to be subjected to the temperature to be measured, an optical system including an incandescent lamp, and means for positioning said tube and said system with respect to said frame with their axes substantially coincident.

3. Optical pyrometric apparatus comprising a frame, a member secured to said frame and having a part serving as a black body adapted to be subjected to the temperature to be measured, an optical system comprising a tube, an incandescent lamp therein, a lamp support secured to said tube and supporting said lamp, and a handle attached to said lamp support and holding said tube upon said frame.

4. Optical pyrometric apparatus comprising a frame, a tube having a closed end serving as a black body adapted to be subjected to the temperature to be measured, an optical system comprising a tube, an incandescent lamp therein, a lamp support secured to said second named tube and supporting said lamp, and a handle attached to said lamp support and holding said second named tube on said frame with its axis coinciding substantially with the axis of said first named tube.

5. Optical pyrometric apparatus comprising a frame, said frame comprising a longitudinally extending member, a bracket thereon, a tube adapted to be presented to the material whose temperature is to be measured held in said bracket, a second bracket on said longitudinally extending member, and an optical system supported in said second bracket, the axes of said tube and system being substantially co-incident.

6. Optical pyrometric apparatus comprising a frame, said frame comprising a longitudinally extending member and brackets secured thereto, a tube adapted to be presented to the material whose temperature is to be measured supported in one of said brackets, an optical system comprising a tube, an incandescent lamp therein, a lamp support supporting said lamp, and means for securing said tube of said optical system to another of said brackets, said first named tube and said optical system being substantially co-axial.

7. Optical pyrometric apparatus comprising a frame, said frame comprising a longitudinally extending member and brackets secured thereto, a tube adapted to be presented to the material whose temperature is to be measured supported in one of said brackets, an optical system comprising a tube, an incandescent lamp therein, a lamp support supporting said lamp, and a handle holding the tube of said optical system to another of said brackets, said first named tube and said optical system being substantially co-axial.

8. Portable optical pyrometric apparatus comprising a frame, a tube adapted to be presented to the material whose temperature is to be measured secured on said frame, a handle on said frame, and an optical system disposed at a distance from said tube and secured to said frame, the axes of said optical system and said tube being substantially co-incident.

9. Portable optical pyrometric apparatus comprising a frame, a tube adapted to be presented to the material whose temperature is to be measured secured on said frame, a handle on said frame, an optical system disposed at a distance from said tube and secured to said frame, and a member on said frame adjacent said tube for engaging a support, the axes of said optical system and said tube being substantially co-incident.

10. Optical pyrometric apparatus comprising a frame, a tube secured to said frame and adapted to be presented to the material whose temperature is to be measured, an optical system comprising a tube, an incandescent lamp therein, a lamp support supporting said lamp, means supporting said optical system on said frame with its axis substantially co-incident with the axis of said first named tube, a handle, and connections to said lamp extending through said handle.

In testimony whereof I have hereunto affixed my signature this 4" day of March, 1918.

IRVING B. SMITH.